United States Patent
Chapman et al.

(10) Patent No.: US 10,936,783 B1
(45) Date of Patent: Mar. 2, 2021

(54) RUNTIME EFFICIENT CIRCUIT PLACEMENT SEARCH LOCATION SELECTION

(71) Applicant: Cadence Design Systems, Inc., San Jose, CA (US)

(72) Inventors: Andrew Mark Chapman, Milton (GB); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/735,669

(22) Filed: Jan. 6, 2020

(51) Int. Cl.
*G06F 30/00* (2020.01)
*G06F 30/394* (2020.01)
*G06F 30/392* (2020.01)
*G06K 9/62* (2006.01)
*G06F 30/31* (2020.01)

(52) U.S. Cl.
CPC .......... *G06F 30/394* (2020.01); *G06F 30/392* (2020.01); *G06K 9/6223* (2013.01); *G06F 30/31* (2020.01); *G06K 2209/19* (2013.01)

(58) Field of Classification Search
CPC ...... G06F 30/392; G06F 30/394; G06F 30/31; G06K 9/6223; G06K 2209/19
See application file for complete search history.

(56) References Cited

U.S. PATENT DOCUMENTS

| | | | | |
|---|---|---|---|---|
| 8,104,014 B2* | 1/2012 | Puri | ...................... | G06F 30/394 |
| | | | | 716/134 |
| 8,589,848 B2* | 11/2013 | Alpert | ................... | G06F 30/392 |
| | | | | 716/118 |
| 8,661,374 B2* | 2/2014 | Vishweshwara | ........ | G06F 30/39 |
| | | | | 716/54 |
| 9,792,398 B2* | 10/2017 | Xu | ......................... | G06F 30/34 |
| 10,289,795 B1* | 5/2019 | Gao | ...................... | G06F 30/394 |
| 10,402,522 B1* | 9/2019 | Viswanathan | ........ | G06F 30/396 |
| 10,691,162 B2* | 6/2020 | Guthaus | ................ | G06F 30/394 |
| 2014/0181772 A1* | 6/2014 | Alpert | ................... | G06F 30/394 |
| | | | | 716/114 |

* cited by examiner

*Primary Examiner* — Naum Levin
(74) *Attorney, Agent, or Firm* — Schwegman Lundberg & Woessner, P.A.

(57) ABSTRACT

Aspects of the present disclosure address improved systems and methods for runtime efficient circuit placement location selection as described herein. An example embodiment includes identifying, for each route of the one or more routes that interconnect the terminals of a circuit design with the one or more pins of a first circuit element, a corresponding set of movement positions along said each route to generate a set of movement configurations for the first circuit element. The set of movement configurations is analyzed to generate a plurality of location clusters from the set of movement configurations, and for each location cluster of the plurality of location clusters, identifying one or more selected movement configurations within said each cluster. The one or more selected movement configurations for said each cluster to select an updated movement configuration.

20 Claims, 12 Drawing Sheets

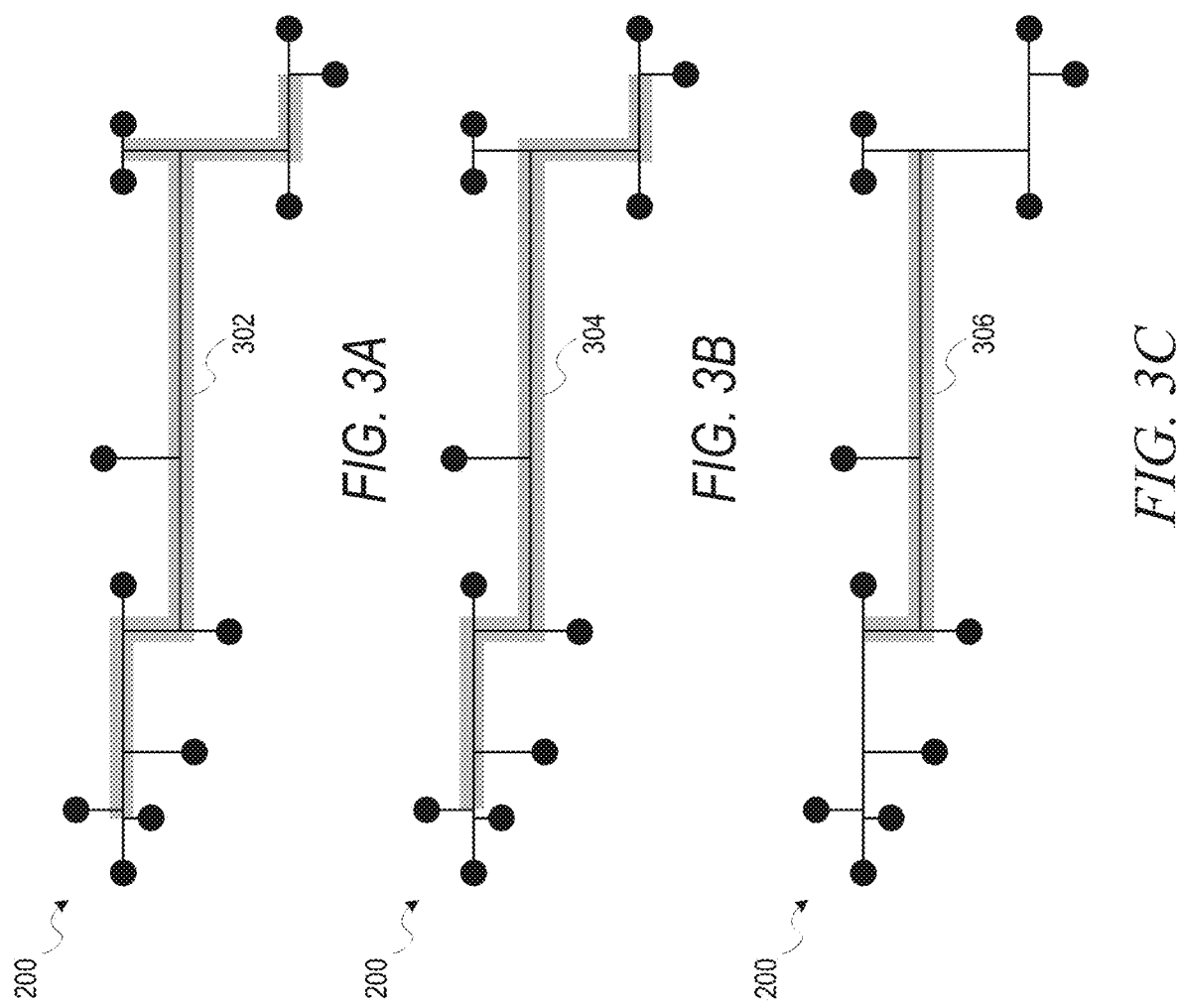

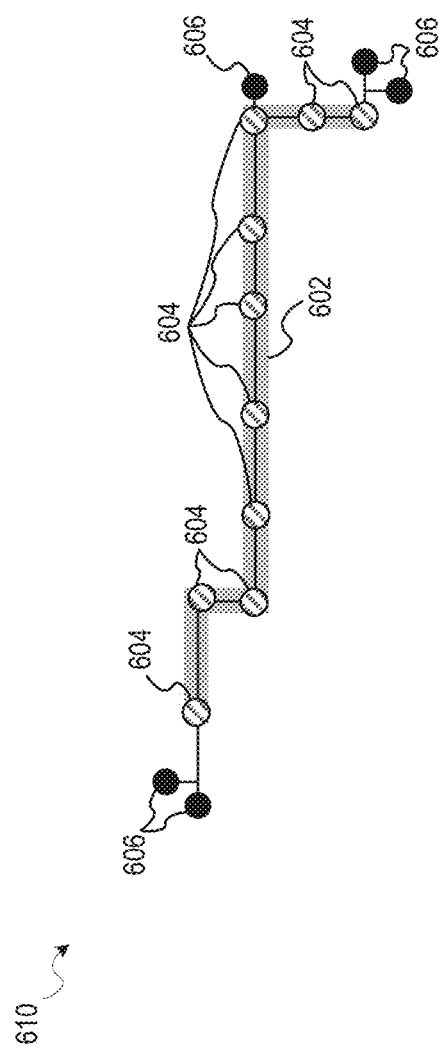
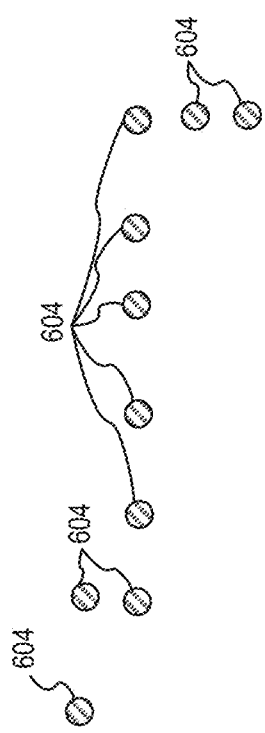
FIG. 6A
FIG. 6B

RUNTIME EFFICIENT CIRCUIT PLACEMENT SEARCH LOCATION SELECTION

TECHNICAL FIELD

The present disclosure generally relates to the technical field of integrated circuit design. In particular, the present disclosure addresses systems and methods for optimizing clock tree wirelength.

BACKGROUND

An integrated circuit (IC) layout specifies portions of various components of an IC. When the IC is to include a large number of registers, latches, flip-flops and/or other types of clocked devices ("sinks") that are to be clocked by one or more clocks, the IC must include one or more clock trees for delivering the clock signal from the clock source to all of the sinks to be clocked by it. A clock tree distributes a clock signal from its root to a set of sinks within an IC through a branching network of drivers (e.g., buffers or inverters). A single driver distributes the clock signal to a grouping of other drivers and/or sinks. Connectivity between a driver and its fanout is represented by a "clock net" and will be physically implemented by routed wires.

Electronic design automation (EDA) software systems commonly perform clock-tree synthesis (CTS). Conventional approaches to CTS typically include a global wirelength reduction stage and a detailed wirelength reduction stage. During the global wirelength reduction stage, circuit elements such as components of the clock tree (referred to hereinafter as "clock instances") are interconnected using a Steiner-tree approach in which the components are aligned to a Steiner route between their parents and children. During the detailed wirelength reduction stage, a compass-search algorithm is used to iteratively move clock instances to different locations, and a validation is performed at each move to verify the move results in a reduction in wirelength and conforms with design constraints (e.g., skew and slew). However, the compass-search, algorithm-based wirelength reduction is slow because it is a brute force approach that tests locations in an unguided way. While CTS can use such results to guide future searches, storing and maintaining this information utilizes a large amount of computational resources. Additionally, to save runtime, the compass-search algorithm is "greedy," so the algorithm can easily get stuck in a local minimum, which means that despite the high runtime, the algorithm may not find an optimal location.

BRIEF DESCRIPTION OF THE DRAWINGS

Various ones of the appended drawings merely illustrate example embodiments of the present inventive subject matter and cannot be considered as limiting its scope.

FIGS. 3A-3C are conceptual diagrams that illustrate multiple core routes for selecting possible movement positions for a wirelength reduction process, according to some embodiments.

FIGS. 6A-6B are conceptual diagrams that illustrate identification of movement positions for a wirelength reduction process, according to some embodiments.

DETAILED DESCRIPTION

Figure 1:
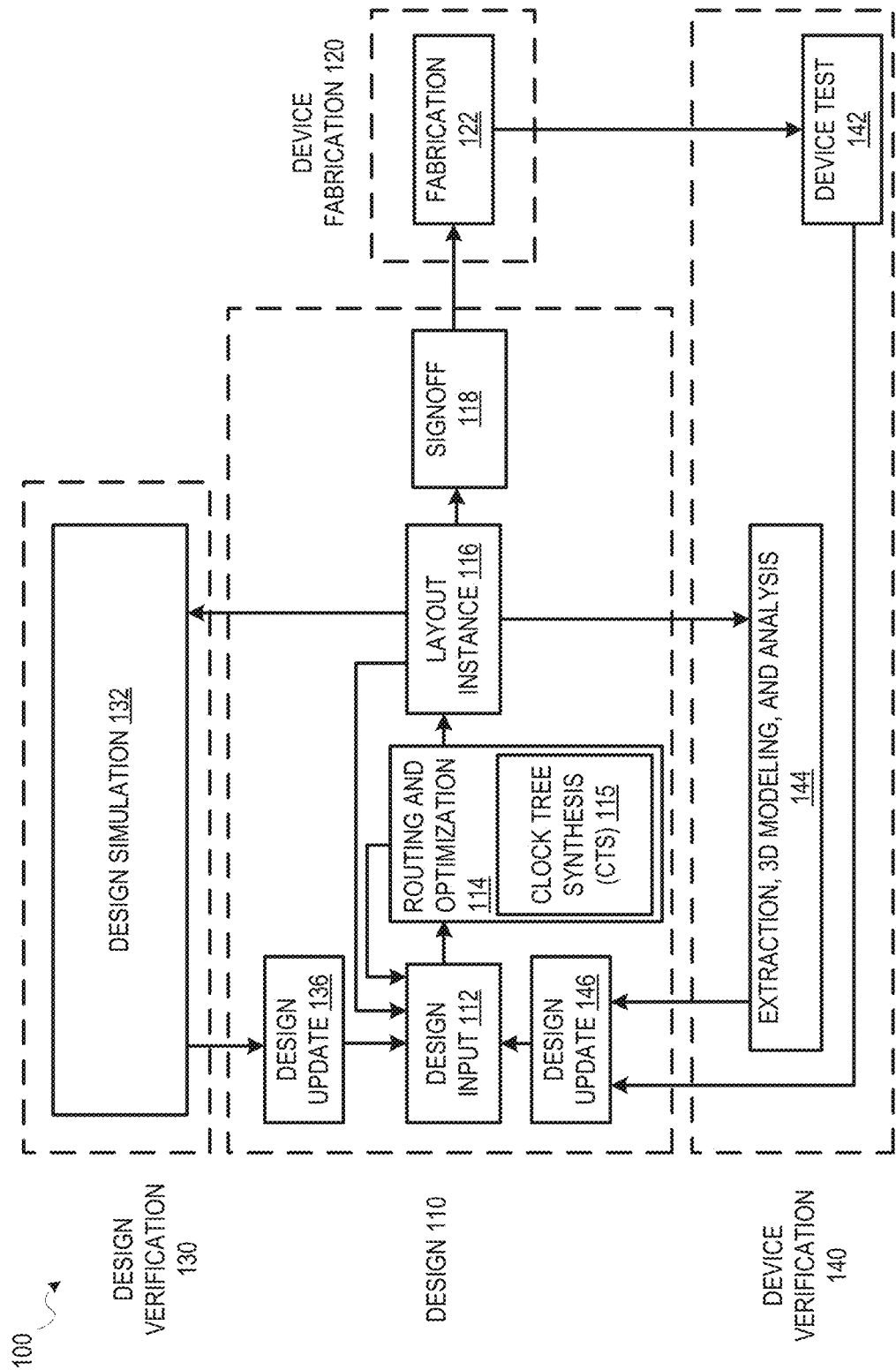
FIG. 1 is a diagram illustrating an example design process flow that includes a wirelength reduction process, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, traditional techniques for routing tree wirelength reduction rely on brute force approaches that are computationally intensive and frequently fail to identify optimal solutions. In particular, circuit elements connected to multiple wiring networks (e.g. multiple clock nets or wire routings as part of a clock tree) increase the number of possible movement points exponentially as the pins of a circuit element connected to different routes increase, and the performance of different placements on the different routes are not continuous, and so cannot simply be optimized with a simple search function. Additionally, while identification of the potential positions that a circuit element (e.g. a clock gate) can be moved to can be identified with limited use of resources, the process of determining which of the identified points does not result in design rule violations and provides the best performance can be extremely computationally expensive for each position analyzed.

Aspects of the present disclosure address this problem, among others, with systems and methods routing tree wirelength reduction that include identifying possible movement positions, and then clustering the possible movement positions by their place in the circuit design layout (e.g. using K-means clustering or other such clustering algorithms). Certain positions within each cluster can then be selected, such as positions closest to a center of each cluster, or positions farthest from an initial position of the circuit element within the circuit design. Such positions can provide a filter to sample positions most likely to provide improvements, while avoiding redundancy in analysis of possible movement positions. Such embodiments improve the operation of EDA computing devices by reducing the computing resources (e.g. processor cycles or computing time) to achieve a desired level of wirelength reduction, as well as creating a more stable and predictable use of computing resources by limiting the number of positions to be analyzed to a small number of points per cluster (e.g. as compared to a brute force algorithm that may analyze any number of points until a desired result is achieved with a much larger potential number of positions to analyze). Such embodiments can also improve the resulting circuits by providing improved designs (e.g. improved performance with reduced wirelength) due to the efficiency of EDA operations used to create the design for the circuit.

FIG. 1 is a diagram illustrating an example design process flow 100 that includes routing tree reduction (e.g. for a clock tree) based on clustering of selected possible combinations of placement positions. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. While the design process flow 100 shows optimization 114 occurring prior to a layout instance 116, routing, timing analysis, and optimization 114 may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

Embodiments described herein can be used to optimize the placement of any circuit element within a circuit design that is connected to one or more routes in the circuit design. This can particularly include optimizations of clock trees. As shown, the routing and optimization 114 operation includes a clock tree synthesis (CTS) 115 operation, which may be performed in accordance with various embodiments described herein. The CTS 115 operation can generate a clock tree that delivers a clock signal from a clock tree root, which comprises a clock source of a circuit design, to a plurality of clock tree leaf nodes, which comprises a plurality of clock tree sinks within the circuit design. According to various embodiments, the clock tree generation performed as part of the CTS 115 operation includes the use of embodiments described herein to place clock gates, clock drivers, or other circuit elements at various regions of the IC design based on satisfaction of a set of clock tree design constraints, which can include slew, latency, and power consumption by the generated clock tree. Each clock tree driver delivers the clock signal to a set of clock sinks and/or a set of clock drivers. A clock net of the IC design describes interconnections between a clock driver and the clock sinks and drivers that are driven by the clock driver. Any one of the clock sources, sinks, and drivers may be referred to herein as a "clock instance."

As will be discussed in further detail below, an initial clock tree is constructed, for example, using the Steiner-tree approach. With the Steiner-tree approach, a minimum rectilinear Steiner tree (MRST) is used for routing a multi-pin clock net with minimum wire length. Given m points in the plane, an MRST connects all points by rectilinear lines, possibly via some extra points (called Steiner points), to achieve a minimum-wire-length tree of rectilinear edges. It shall be appreciated that the Steiner-tree approach is merely an example of the approach used to construct the initial clock tree, and in other embodiments, the computing device may utilize one of several known clock tree construction techniques to construct the initial clock tree.

As will be discussed further below, the initial clock tree may be iteratively refined as part of a clock tree wirelength reduction process. As part of this process, a new potential location for each clock instance is determined and validated to verify it results in a wirelength reduction and conforms to timing-based design constraints. At each iteration, terminals of a clock instance (e.g., routed pins) are identified and potential movement positions along the routes connecting the terminals can be identified. Clusters of positions can then be identified from all the possible movement positions, with a limited number of points within each cluster selected for timing analysis to determine a movement position generating an expected greatest wirelength reduction while also not violating any design rules. In some embodiments, the possible movement positions are selected along "core routes". In some embodiments, the core route is determined based on a transitive fanout threshold. The transitive fanout threshold is determined based on a total number of pins in the clock tree and a predetermined transitive fanout percentage. In some embodiments, the core route is determined based on a wirelength threshold.

Assuming the selected positions within the clusters result in at least one position that does not violate design rules for the circuit design (e.g. a successful validation of the updated clock tree), the clock tree wirelength reduction process moves to the next clock tree instance in the clock tree, and a new location for the next clock tree is determined and validated in the same manner as described above. The process may be repeated until a new location has been tested for every clock tree instance in the clock tree.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

A design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2A:
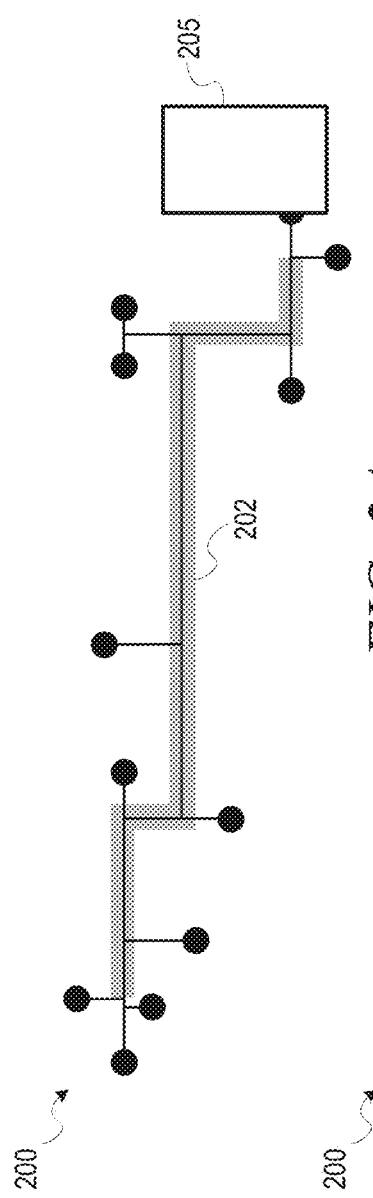
FIGS. 2A-2C are conceptual diagrams that illustrate a core-route-based process for selecting possible movement positions, according to some embodiments.
Figure 2B:
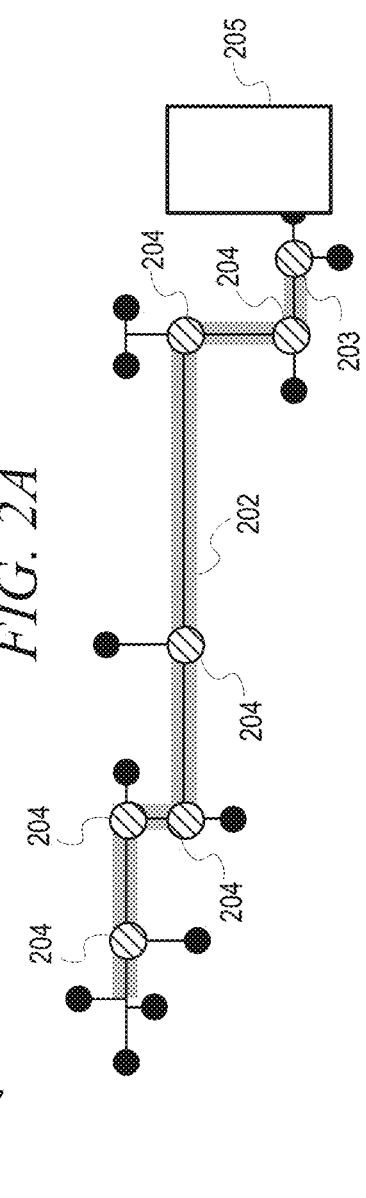
Figure 2C:
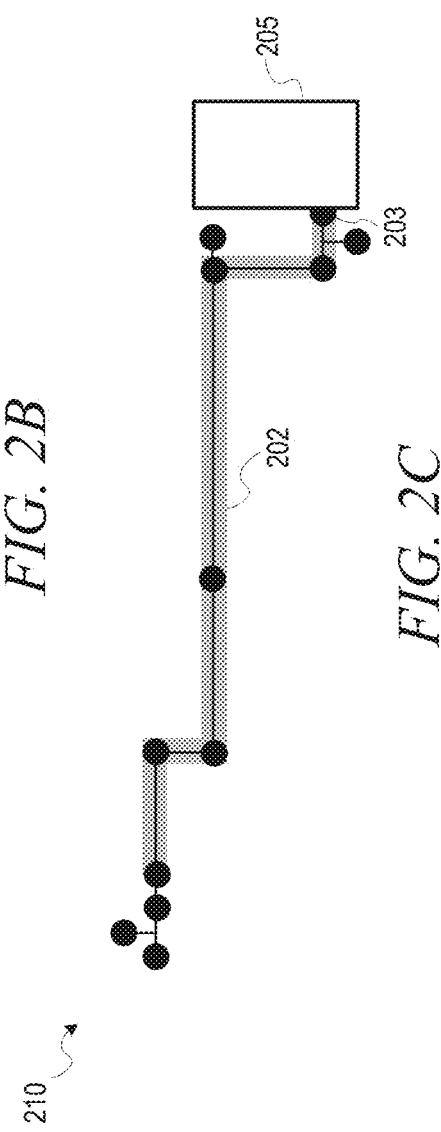

FIGS. 2A-2C are conceptual diagrams that illustrate aspects of selection of movement positions with a route-based wirelength reduction process, according to some embodiments. FIGS. 2A-2C are discussed in the context of wirelength reduction of a clock tree, but it will be understood that similar embodiments can be used to reduce wirelength in the placement of any circuit element within a circuit design routing. With reference to FIG. 2A, a portion of a clock net 200 is illustrated. The portion of clock tree shown as clock net 200 comprises routes that connect pins of a clock net. In the context of FIGS. 2A-2C, solid circles are used to represent pins and lines are used to represent routes for wires that interconnect the pins. During an analysis for wirelength reduction, a circuit element 205 (e.g. a clock driver) has an initial position, and movement positions are identified as possible new placements for the circuit element. As described above, this can include many circuit elements connected to a single route, and the operations described herein can be repeated for each circuit element connected to a route (e.g. not just circuit element 205, but other circuit elements connected to the same route(s) as circuit element 205). This includes circuit elements for each pin in the multi-pin clock net corresponds to a terminal of a clock instance (e.g., a clock driver or a clock sink). As will be discussed in further detail below, in the example illustrated in FIGS. 2A-2C, in some embodiments a core route 202 is identified based on a transitive fanout threshold that is determined based on a total number of terminals in the clock net and a predetermined transitive fanout percentage (e.g., 40%, 30%, 25%, 15%, etc.). The core route 202 is identified such that the transitive fanout (e.g., a number of connected terminals) of any given branch (i.e., a node with two or more connected edges) outside the core route 202 does not exceed the transitive fanout threshold.

As part of the core-route-based clock tree wirelength reduction process, elements of clock net instances (e.g. which are part of a larger clock tree) are iteratively moved toward the core route 202. In particular, as shown in FIG. 2B, movement positions 204 for moving clock tree instances toward the core route 202 are determined, and as shown in FIG. 2C, the clock net 200 is updated by moving clock net instance terminals toward the movement positions 204, thereby resulting in an updated clock tree 210 in which clock instances are placed closer to the core route 202. For example, circuit element 205 moves from the initial position in FIGS. 2A and 2B to an updated movement position 203 in FIG. 2C, where updated movement position 203 selected over other movement positions 204 using clustering selection and analysis operations as described in more detail below.

As noted above, in some embodiments the core route 202 is determined based on a transitive fanout threshold that is determined based on a total number of terminals connected by the clock net 200 and a predetermined transitive fanout percentage. In the example illustrated in FIGS. 2A-2C, the portion of the clock tree shown as clock net 200 comprises twelve terminals and the predetermined transitive fanout percentage is 25%. Hence, the transitive fanout threshold used to determine the core route 202 is 3 terminals. That is, the transitive fanout of any given branch outside the core route 202 does not exceed 3 terminals. Branches can have less than three terminals under such circumstances, depending on various selections and the branch lengths being analyzed to select movement positions. In some embodiments, a core rout with every non-core branch having a fixed number of terminals can be used. As will be discussed further below, the core-route-based wirelength reduction process may be performed in multiple iterations, and at each iteration a different transitive fanout percentage may be used to determine the transitive fanout threshold for identifying the core route. A corresponding set of movement positions for each route can then be organized as possible movement configuration (e.g. with a movement position for each route as part of each configuration), and the different configurations clustered to limit the resources used in the selection of an eventual movement place selection.

As an example of the foregoing, FIGS. 3A-3C illustrate additional core routes for the clock net 200 based on various transitive fanout percentages. In FIG. 3A, core route 302 is determined based on a transitive fanout percentage of 8%, which leads to a transitive fanout threshold of 1 terminal (8% of 12 is 1). Thus, the transitive fanout of any given branch in the core route 302 exceeds 1 terminal. In FIG. 3B, core route 304 is determined based on a transitive fanout percentage of 17%, which leads to a transitive fanout of 2 terminals (17% of 12 is 2). Thus, the transitive fanout of any given branch in the core route 302 exceeds 2 terminals. In FIG. 3C, core route 306 is determined based on a transitive fanout percentage of 33%, which leads to a transitive fanout of 4 terminals (33% of 12 is 4). Thus, the transitive fanout of any given branch in the core route 302 exceeds 4 terminals.

Figure 4:
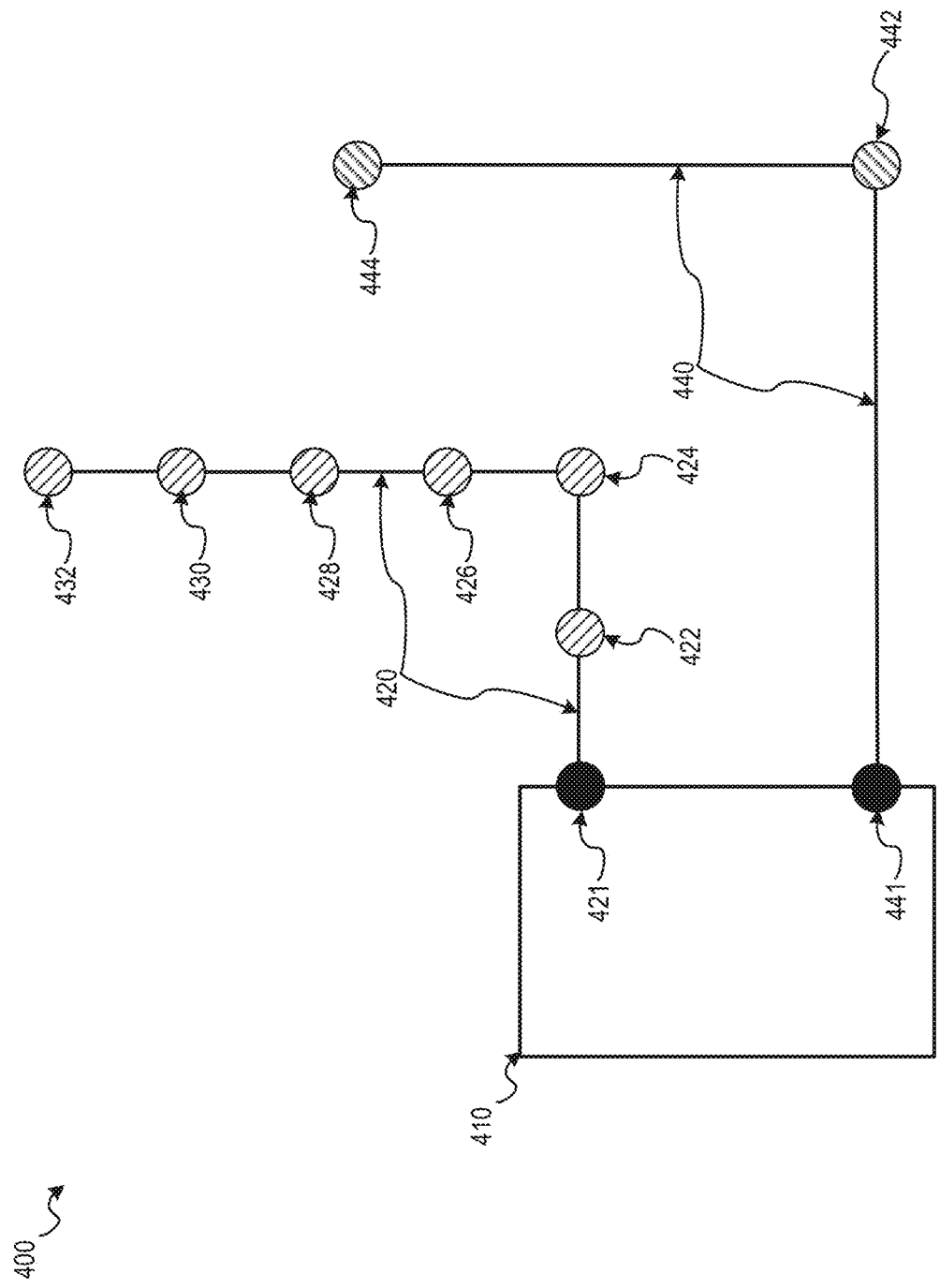
FIG. 4 is a conceptual diagram illustrating multiple routes connected to a single circuit element to be analyzed for movement as part of a wirelength reduction process in accordance with some embodiments.
Figure 5:
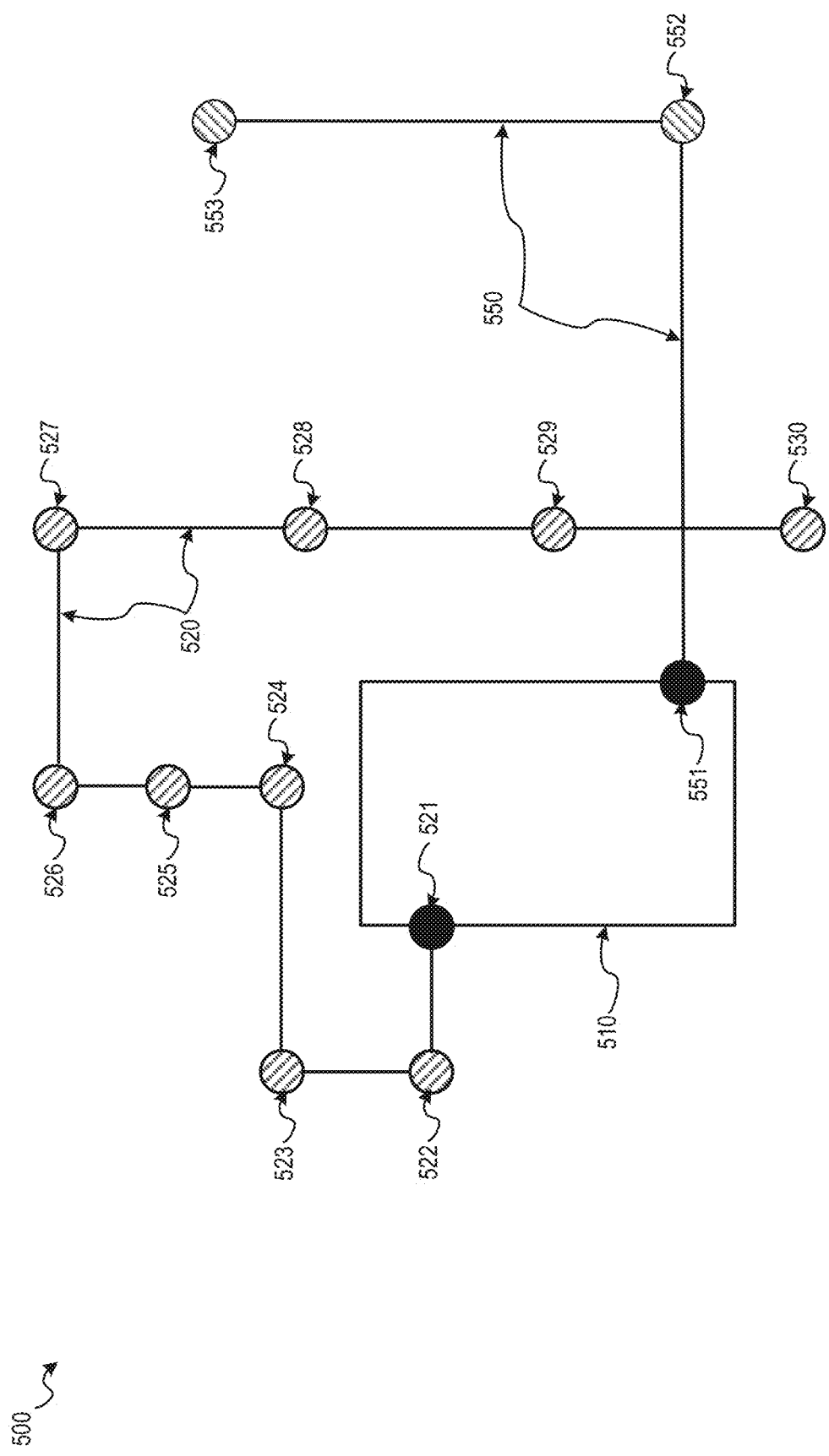
FIG. 5 is a conceptual diagram illustrating multiple routes connected to a single circuit element to be analyzed for movement as part of a wirelength reduction process in accordance with some embodiments.

FIGS. 4 and 5 are conceptual diagrams illustrating multiple routes connected to a single circuit element to be analyzed for movement as part of a wirelength reduction process in accordance with some embodiments. FIG. 4 is a conceptual diagram illustrating multiple routes (e.g. routes 420 and 440) connected to a single circuit element 410 to be analyzed for movement as part of a wirelength reduction for a circuit design 400 in accordance with some embodiments. FIGS. 2A-C and 3A-B illustrate a single route which can be a portion of a routing tree (e.g. a clock tree) or any routing as part of a clock path, a data path, or any path in a circuit design where wirelength can be reduced as part of connections of one or more routes (e.g. nets of terminals connected by wiring). When a circuit element (e.g. an instance of a clock sink) is connected only to a single route, then movement options for that circuit element can be fairly simple along the single route. When a circuit element is connected to multiple routes, then the complexity increases rapidly. FIG. 4 shows circuit element 410 with two connections to two different routes, shown as route 420 with an initial terminal 421 for an initial placement position of circuit element 410 and route 440 with an initial terminal 441 for the initial placement position. FIG. 4 additionally includes movement position 422, 424, 426, 428, 430, or 432 along route 420, and movement positions 442 and 444 along route 440. The initial terminals 421 and 441 can be generated as part of the initial design of a circuit design flow 100 as described above. Movement positions 422-432 and 442-444 can be generated as described above (e.g. along core routes), or can be selected using any process, including designer selection, simple sampling at periodic distances along a route, or any other such selection process.

In FIG. 4, the initial terminals 421 and 441 are the locations of pins of circuit element 410. Movement positions 422-432 and 442-444 are possible locations for terminals to connect to a corresponding pin. This includes movement positions of the circuit element 410 such that a pin of circuit element 410 is located at a particular movement position, as well as movement positions of the circuit element such that a pin of the circuit element 410 is connected to a particular movement position via a route, with the pin located at a different position. A particular location of a circuit element within a layout of a circuit design can thus have multiple movement configurations with different wirelengths for each movement configuration. For example, in one movement configuration, the pin of circuit element 410 initially located at initial terminal 421 can be repositioned such that it is now located at movement position 432. Because of the physical structure of circuit element 410, the pin of circuit element 410 previously located at initial terminal 441 will be in a new position, and route 440 will adjusted to accommodate the new location of the pin. The movement configurations, as described above, will include options for this pin to be connected to any of the movement locations, as well as the location of initial terminal 441.

As part of a wirelength reduction process, the number of movement configurations is the number of movement locations (e.g. positions) for each route, including the initial placement terminal, multiplied by each other. The circuit design 400 of FIG. 4, for example, includes seven movement locations along route 420 (e.g. initial terminal 421 as well as movement positions, 422-432, for a total of seven) and three movement locations along route 440 (e.g. initial terminal 441 and movement positions 442 and 444, for a total of three). The number of possible configurations is thus seven multiplied by three, or twenty one. The number of routes and the number of movement locations along each route thus cause the number of movement configurations to increase rapidly with increasing numbers of routes and movement locations. Three routes (e.g. connected to three pins of a circuit element) with ten movement locations for each route, results in 1000 possible movement configurations. Even though the placement of the circuit element is the same for multiple configurations (e.g. there are seven configurations for circuit element 410 when the lower pin is positioned at initial terminal 441 as shown), the connections from the upper pin to any of movement positions 422 through 432 result in different performance characteristics. Because shorter wirelength configurations can result in design rule violations in some embodiments, an analysis cannot simply discard movement configurations where one movement position for a given route results in a longer wirelength for that route.

FIG. 5 is a conceptual diagram illustrating a portion of a circuit design 500 with multiple routes 520, 550 connected to a single circuit element 510 to be analyzed for movement as part of a wirelength reduction process in accordance with some embodiments. Circuit design 500 includes initial terminals 521 and 551 for pins of circuit element 510 connected to routes 520 and 550. Routes 520 and 550 will continue to other terminals, which are not shown, and so the illustration only shows a portion of routes 520 and 550 that would be present in a circuit design. Movement positions 522, 523, 524, 525, 526, 527, 528, 529, 530, 552, 553 can be identified along routes 520 and 550, respectively, using various different algorithms as described above. As illustrated by the circuit design 500, movement of circuit element 510 in a given direction that reduces wirelength for one route will not necessarily reduce the overall wirelength for a given configuration. For example, shifting circuit element 510 to the left such that the pin of circuit element 510 is shifted to movement position 522 will shorten the wirelength of route 520, but extend the wirelength of route 550 by an equal amount, resulting in no reduction in overall wirelength. Similarly, shifts between positions that map pins or terminals associated with particular routes can result in significantly different performance than shifts for other pins associated with different routes connected to the same circuit element. Because of this, a binary search or optimization search by sliding along routes will not achieve an efficient location of preferred performance results in many situations. While FIGS. 4 and 5 illustrate simple routes with a limited number of possible movement configurations (e.g. combinations of movement positions along each route), actual circuit design routes can involve significantly greater complexity and larger numbers of movement positions as well as movement configurations for circuit elements connected to multiple routes. As stated above, such movement configurations can be identified and, rather than being analyzed individually, and be clustered to identify selected movement positions by cluster which allows processing resources to be focused on different non-redundant configurations that are more likely to provide a configuration with an improved result.

Figure 7A:
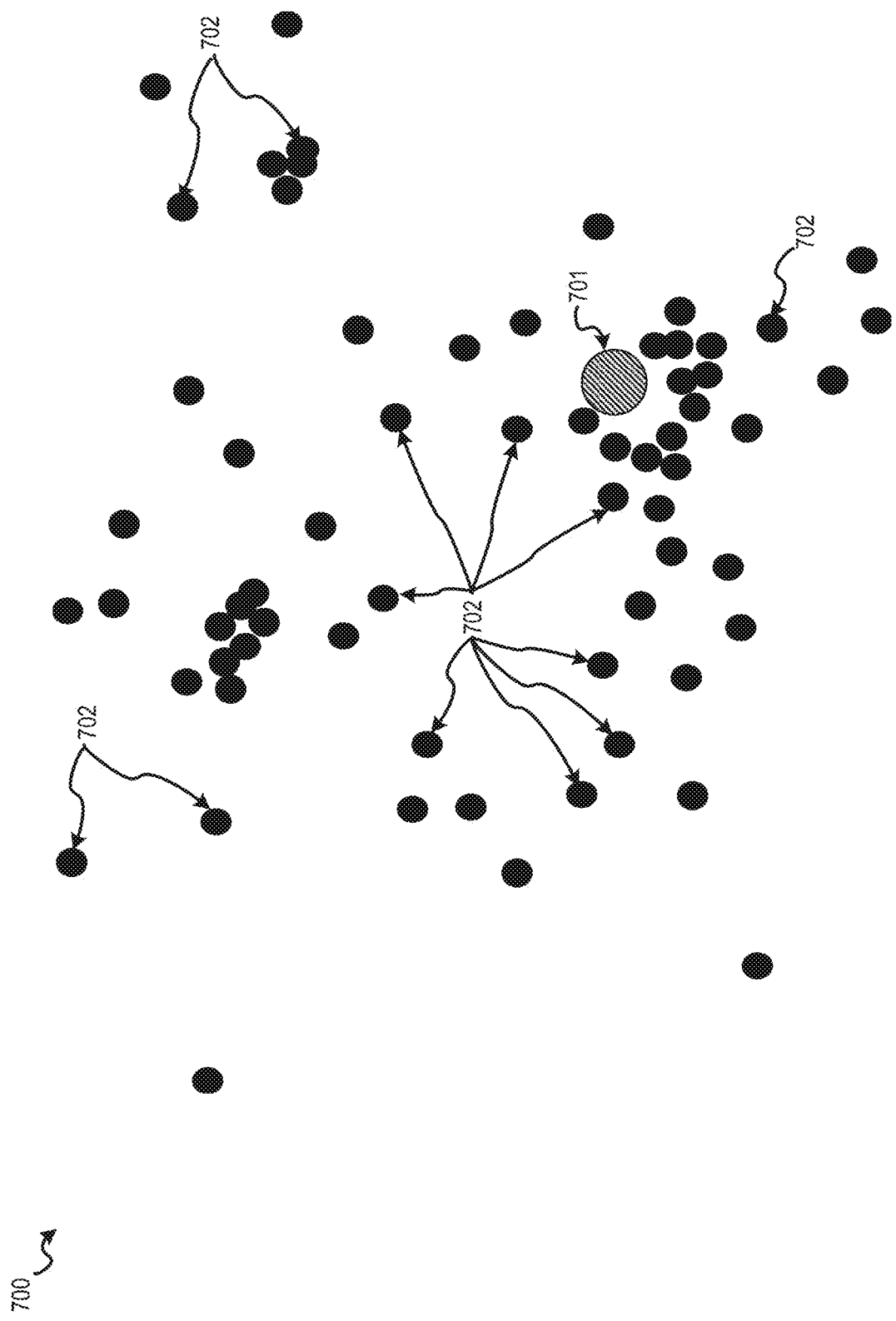
FIGS. 7A-7B are conceptual diagrams that illustrate clustering of movement positions for a wirelength reduction process, according to some embodiments.
Figure 7B:
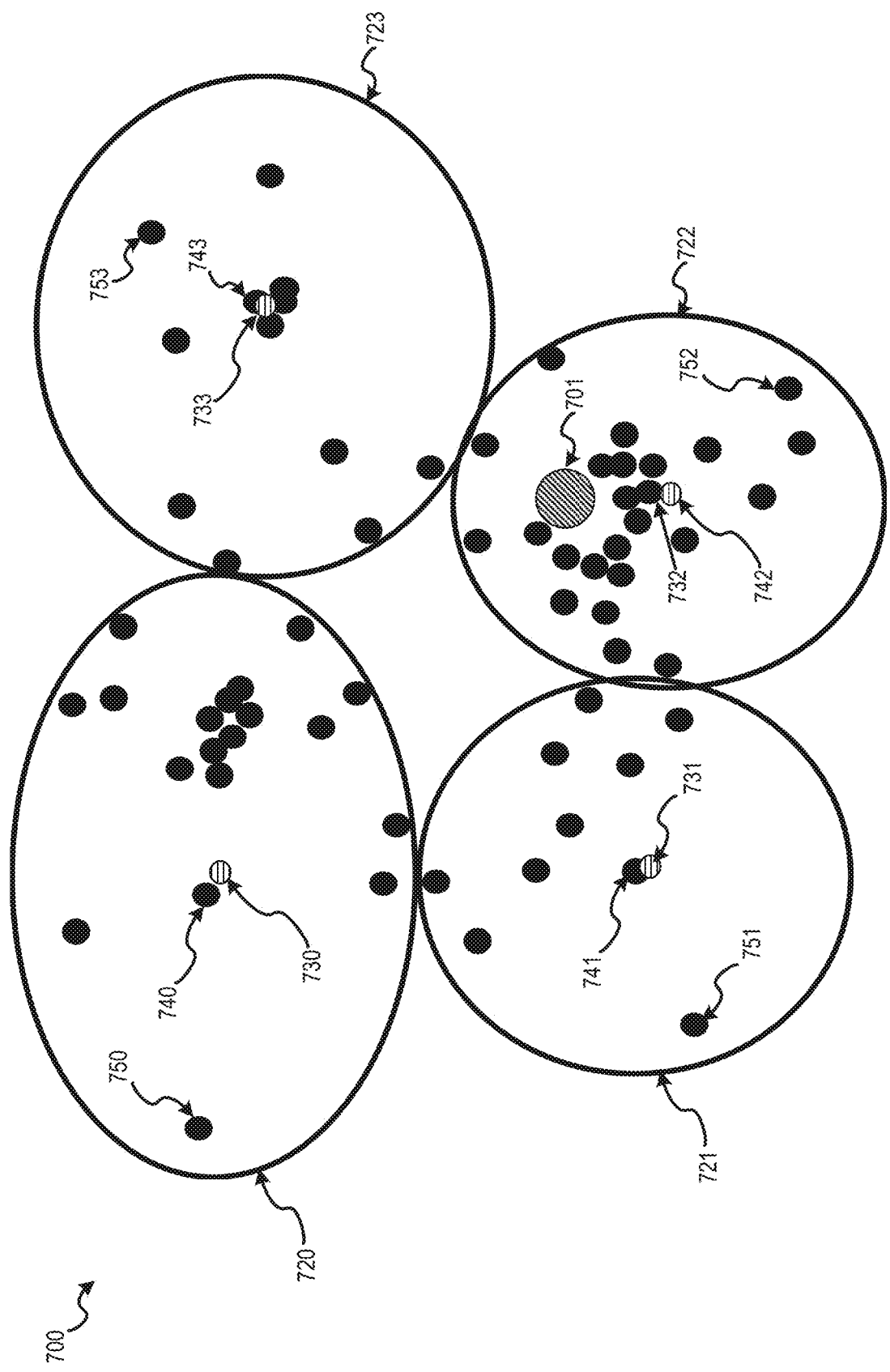

FIGS. 6A-6B are conceptual diagrams that illustrate identification of movement positions to be used in clusters for a wirelength reduction process, according to some embodiments. FIGS. 7A-7B are conceptual diagrams that illustrate clustering of movement configuration data for a wirelength reduction process, according to some embodiments. FIG. 6A shows a route (e.g. net) that can be connected to a circuit element as part of a routing within a circuit design. Similar to the routes described above, route 610 includes a number of terminals 606, along with movement positions 604 identified along a core route 602. Each terminal 606 can be generated as an initial terminal associated with a pin of a corresponding circuit element, and can be repositioned during wirelength reduction operations as described herein. During an operation to consider movement of terminals (e.g. to reduce wirelength) for a particular route such as route 610, the movement positions 604 can be isolated for clustering as shown by FIG. 6B, with coordinates for each movement positions, and combinations of movement positions for particular movement configurations (e.g. for circuit elements connected to multiple routes) can be stored in a memory for clustering analysis and selection of movement configurations (e.g. one movement position per connected route for a circuit element). Such data can include coordinates of each movement position according to a Manhattan grid used to generate the physical layout of a circuit design, or any such representation of the physical locations for a circuit design. FIG. 7A then shows movement position data 700 for a clustering analysis in accordance with embodiments described herein. Position data 700 shows black dots for each movement configuration for a particular analysis. While certain movement positions are identified as movement configurations 702, these movement configurations 702 are representative of the large numbers of movement positions possible for analysis of a single move to reduce wirelength in a circuit design. For example, as described above, a single circuit element can be connected to three routes, with each route having a number of movement positions selected along the route. A individual configuration will thus have multiple movement positions (e.g. one position for each route). In some embodiments, for the position data 700, each individual configuration is processed to determine a weighted average position, and the weighted average position is clustered as described below. In other embodiments, other such processing can be used to identify individual positions for each configuration, and to cluster the positions to select positions (and associated movement configurations) for analysis. FIG. 7A additionally includes an initial position 701 representing an initial position of a circuit element or terminal (e.g. associated with a particular pin of a circuit element) to be considered for movement within a layout of a circuit design. The circuit element associated with initial position 701 will have some physical size, and may occupy multiple grid areas within a layout depending on the particular circuit element. The initial position 701 can be a point on an instance of a circuit element, a pin of a circuit element, or any information that can be used to identify a location of a circuit element within a layout of a circuit design. Movement position data 700 is then clustered into clusters 720, 721, 722, and 723. While four clusters are shown, various embodiments can use any number of clusters. The number of clusters will influence the processing resources used, with increasing numbers of clusters using additional resources while providing finer analysis of possible movement configurations. The clusters 720, 721, 722, and 723 can be generated by K-means clustering, or any other such clustering technique. Once the clusters are generated, selected movement configurations (e.g. a weighted average position associated with a movement configuration having a movement position for each route) within each cluster are identified for detailed analysis. In the illustrated position data 700 of FIG. 7B, each cluster has an center identified (e.g. a most central position for a layout grid) shown as center 730 for cluster 720, center 731 for cluster 721, center 732 for cluster 722, and center 733 for cluster 723. The center data can then be used to identify a corresponding movement position closest to the corresponding center for each cluster, shown as movement configurations 740, 741, 742, and 743 for each corresponding cluster 720, 721, 722, and 723. Position data 700 also includes a movement positions furthest from initial position 701 for each cluster. This includes movement configurations 750, 751, 752, and 753 for each of corresponding clusters 720, 721, 722, and 723. In some embodiments, only the movement position closest to the center of each cluster is analyzed, in some embodiments, only movement positions farthest from the initial position 701 are analyzed. In some embodiments, both the movement position closest to the center and the movement position farthest from the initial position 701 are analyzed for each cluster. In other embodiments, other criteria can be used to select movement positions. This can include criteria applied to select particular movement positions for each cluster, such as those described above, and can also include criteria applied to particular clusters. For example, in some embodiments, a cluster containing initial position 701 can have fewer selected movement positions (e.g. no movement position closest to the center selected) or a cluster with a center or set of movement positions farthest from initial position 701 can have additional selected movement positions. If multiple configurations occupy the same position in the clustered data (e.g. different configurations with the same weighted average position), other criteria can be used to select among these configurations. For example, a configuration with positions closer to the weighted average position (and therefore associated with a shorter total wirelength) can be selected, or other such "tiebreakers" can be used based on the performance of the similar configurations.

In some embodiments, once selected movement configurations from the clusters are identified, rather than performing a computationally intensive analysis for a movement combination of the selected movement configuration, the selected movement combination (e.g. combination of movement positions with a movement position for each route connected to a circuit element), the movement configurations can be ordered based on a movement distance from initial position 701. The first selected movement configuration with the largest movement distance is used for a full analysis (e.g. wirelength and any design rules for the circuit design). If this movement configuration results in a wirelength reduction without any design rule violations, this movement configuration is selected as a final movement configuration, and the analysis can then proceed to a next circuit element to be considered for a move to reduce wirelength. If the first selected movement configuration does not result in a wirelength reduction or it creates a design rule violation, then the next furthest selected movement configuration is analyzed. This proceeds until all selected movement configurations have been analyzed with no analysis resulting in both a wirelength reduction and no design rule violations. If this occurs, then the initial location can be maintained, an alert generated for a designer, additional movement positions selected for analysis, or any combination of such options. In any case, once the wirelength movement process has been completed for all circuit elements to be analyzed, the design flow can proceed to a next stage of the design process after the cluster based wirelength reduction (e.g. following design flow 100 of FIG. 1).

Figure 8:
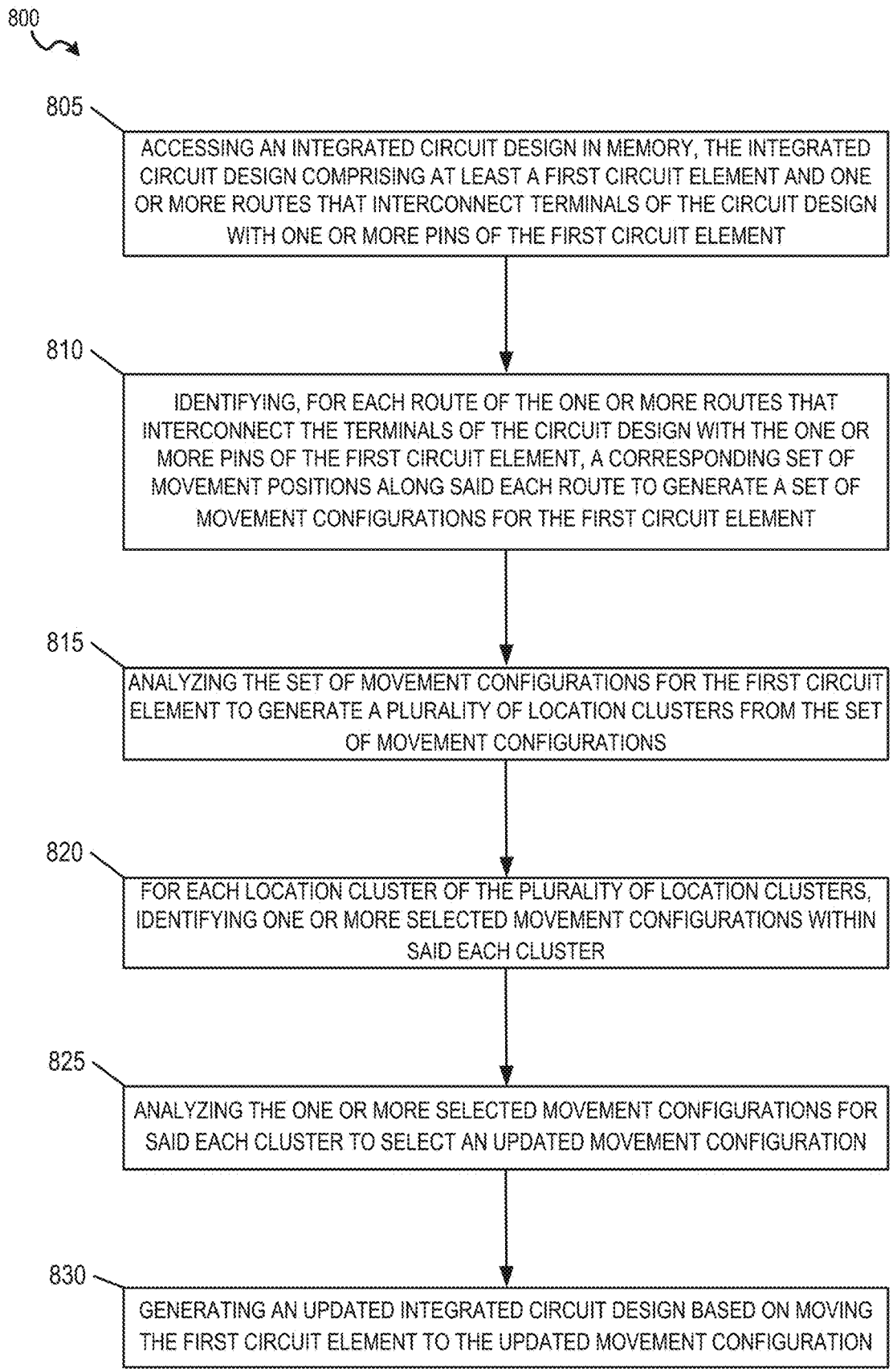
FIG. 8 is a flowchart illustrating operations of a method for clustering based wirelength reduction, according to some example embodiments.

FIG. 8 is a flowchart illustrating operations of a method 800 for clustering based wirelength reduction, according to some example embodiments. It will be understood that the method 800 may be performed by a device, such as a computing device executing instructions of an EDA software system. For instance, the operations of a method 800 may be represented by executable instructions (e.g., EDA software) that, when executed by a processor of a computing device, cause the computing device to perform the method 800. Thus, an operation of the method 800 may be performed by a hardware processor (e.g., central processing unit or graphics processing unit) of a machine (e.g., desktop, server, etc.). Accordingly, the method 800 is described below in reference to such a computing device.

Depending on the embodiment, an operation of the method 800 may be repeated in different ways or involve intervening operations not shown. Though the operations of the method 800 may be depicted and described in a certain order, the order in which the operations are performed may vary among embodiments, including performing certain operations in parallel.

Method 800 begins with operation 805 accessing an integrated circuit design in memory, the integrated circuit design comprising at least a first circuit element and one or more routes that interconnect terminals of the circuit design with one or more pins of the first circuit element In operation 810, for each route of the one or more routes that interconnect the terminals of the circuit design with the one or more pins of the first circuit element, a corresponding set of movement positions is identified for the first circuit element along each route to generate a set of movement configurations for the first circuit element;

The set of movement configurations identified in operation 810 are then analysed in operation 815 for the first circuit element to generate a plurality of location clusters from the set of movement configurations, and in operation 820, for each location cluster of the plurality of location clusters, identifying one or more selected movement configurations within each cluster. In operation 825, the one or more selected movement configurations are analysed for each cluster to select an updated movement configuration, and in operation 830, an updated integrated circuit design is generated based on moving the first circuit element to the updated movement configuration.

Some such embodiments can operate where a first selected movement configuration of the one or more selected movement configurations is identified as a movement configuration closest to a center of each cluster. Some of these embodiments then operate where a second selected movement configuration of the one or more selected movement configurations is identified as a movement configuration for each cluster farthest from an initial placement position.

The updated movement configuration is selected in some embodiments by ordering the one or more selected movement configurations for each cluster by distance from an initial placement position, analysing timing constraints for the one or more selected movement configurations for each cluster by distance starting with a farthest location from the initial placement position, and then selecting the updated movement configuration as a most distant location from the initial placement position that finds a wirelength saving compared with the initial placement position and does not violate the timing constraints. In some embodiments, the corresponding set of movement positions along each route are identified as a first portion of the set of movement configurations at wirelength-measured move fractions along each route. In some such embodiments, the corresponding set of movement positions along each route are identified as a second portion of the set of movement configurations at wirelength measured move fractions along each route. In some embodiments, the corresponding set of movement positions along each route generate the movement configurations by combining the first portion of the set of movement configurations and the second portion of the set of movement configurations along each route into a predetermined number of movement configurations for each route.

The set of movement configurations is generated, in some embodiments, by computing all combinations of the corresponding set of movement positions along each route, with each combination of all combinations consisting of one corresponding movement configuration from each route. For some such embodiments, the plurality of location clusters from the set of movement configurations is generated using K-means clustering. In other embodiments, any other suitable clustering algorithm, including algorithms other than K-means clustering, are used.

The first circuit element can be a clock gate as part of a clock tree in some embodiments, or can be another circuit element in any routing system where a wirelength for wires connected to the circuit element can be reduced in accordance with the embodiments described herein. In some such embodiments, a clock gate is coupled with three routes (e.g. clock path and data path nets) with each route having nine or fewer movement locations along each route, such that the total number of movement combinations is 729 or fewer. Similarly, some embodiments are limited to ten or fewer movement locations along each route, so that a circuit element with two connected routes has a limit to all combinations of 100 or fewer and a circuit with three connected routes has a limit to all combinations of 1000 or fewer. Similarly, the number of clusters can be limited to cap the processing resources used for wirelength reduction. Some embodiments can use a maximum of five clusters, some embodiments can use four clusters to balance the processing resource usage against the sampling of movement combinations from multiple clusters, and other embodiments can use any number of clusters targeted to the processing and coverage needs of a particular design flow. In some embodiments, generating the corresponding set of movement positions along each route occurs with a core route for each route, where the core route for each route comprises a portion of the route having a maximum transitive fanout that is less than a transitive fanout threshold.

Clock instances that can be analysed for movement to reduce wirelength as described herein include not only clock gates as described above, but any other such circuit element, including Multiplexor instances, logic instances (e.g. AND-gates, OR-gates, etc.), and drivers (e.g. buffers, inverters, etc.) Multiplexors and logic gates can particularly be associated with operations likely to have complex analysis operations that benefit from the clustering embodiments described herein, as such instances can be more likely to have large numbers of movement configurations to be considered where three terminals are all connected to clock nets.

In some embodiments, the movement locations can be determined for the embodiments above as follows. The computing device determines a core route in the clock tree (e.g., core route 202). The transitive fanout threshold is determined based on a total number of terminals in the clock tree and a predetermined transitive fanout percentage. For example, given a clock tree with 12 terminals and a transitive fanout percentage of 33%, the transitive fanout threshold is 4 (33% of 12). Consistent with these embodiments, the determining of the core route includes identifying a portion of a route in the clock tree having a maximum transitive fanout that exceeds the transitive fanout threshold. The identified route comprises edges of the clock tree with the greatest fanout that exceed the transitive fanout threshold. The computing device determines the core route in the clock tree based on a wirelength threshold. The wirelength threshold is determined based on a total wirelength of the clock net and a predetermined wirelength percentage. In various embodiments, the wirelength threshold can be a custom length for each analyzed clock net. Consistent with these embodiments, the determining of the core route includes identifying a portion of a route in the clock tree comprising one or more nodes that drive a wirelength that exceeds the wirelength threshold. The computing device then determines offsets for each terminal of the clock tree instance. The computing device may determine an offset for a terminal of the clock tree instance based on a distance between the terminal and the core route. Each terminal of the clock tree instance corresponds to a pin of the clock tree instance. In the clock tree, each terminal is connected to a route that connects the clock tree instance to a terminal of another clock instance (e.g., a parent or child of the clock instance). Some clock instances such as buffers and inverters may include two terminals (e.g., an input terminal and an output terminal) while other clock tree instances such as logic gates may include three or more terminals. In determining a distance between a terminal and the core route, the computing device may determine a Manhattan distance between the terminal and the core route. Hence, an offset may comprise a Manhattan distance between a terminal and the core route.

Figure 9A:
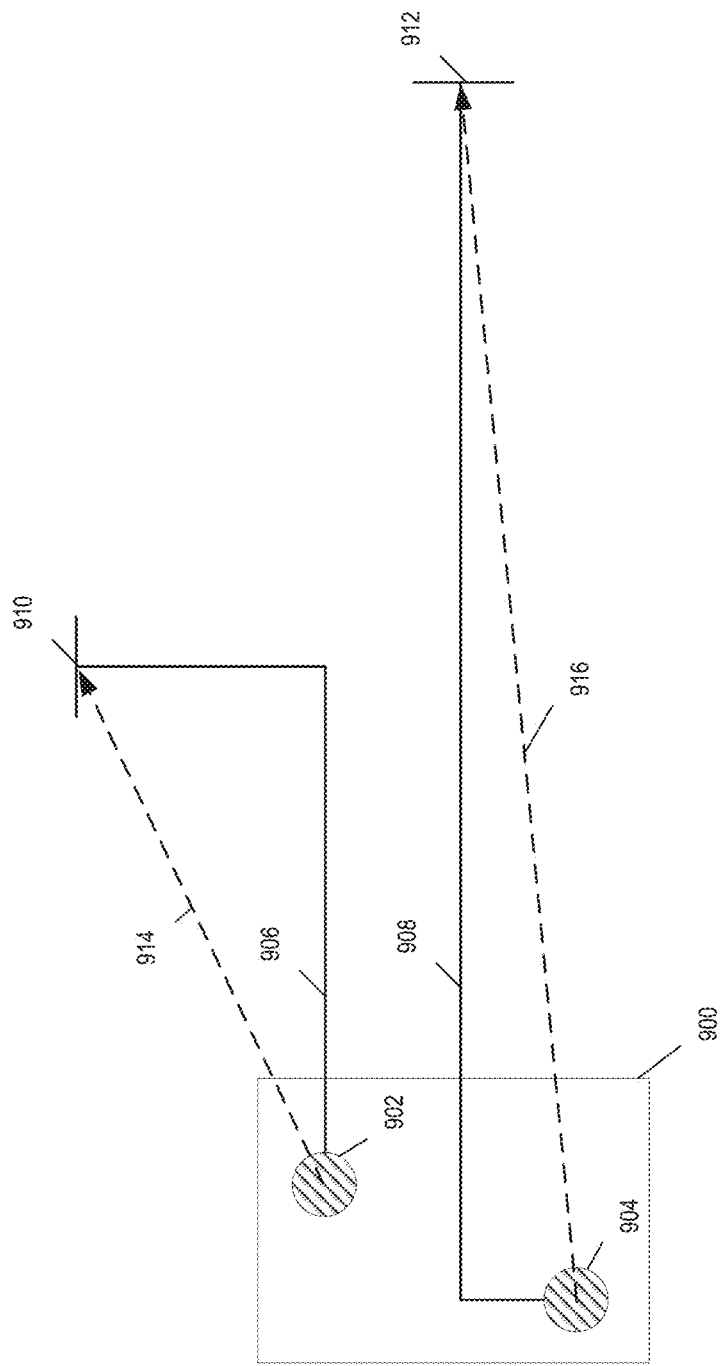
FIGS. 9A and 9B are conceptual diagrams that graphically illustrate an operation of determining a target offset in connected routes of a clock tree instance, which is performed as part of a method for wirelength reduction, according to some example embodiments.
Figure 9B:
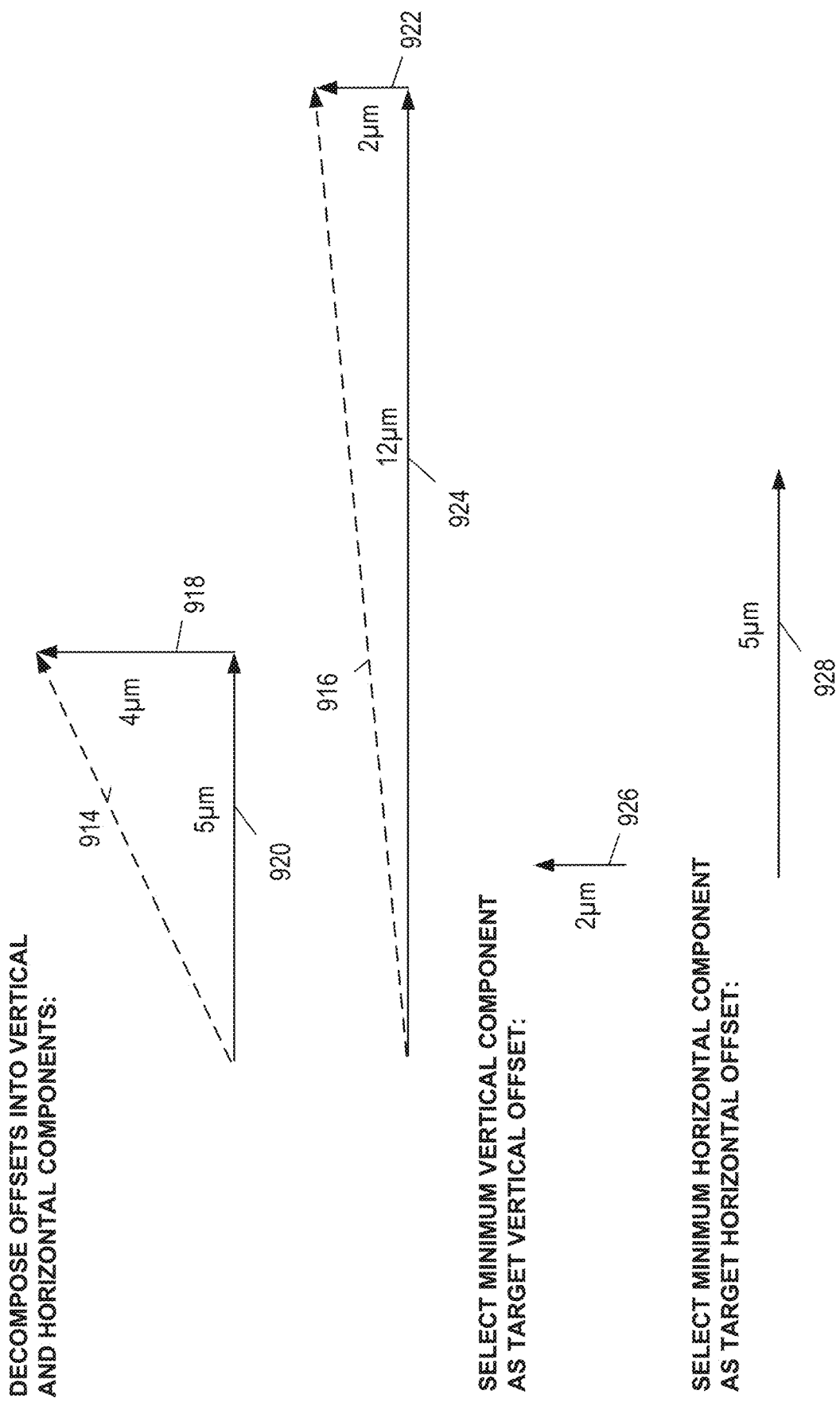

FIGS. 9A and 9B are conceptual diagrams that graphically illustrate an operation of determining a target offset for a routing instance 900 (e.g., performed by a computing device executing instructions of an EDA software system), to identify movement positions according to some example embodiments. These movement positions can then be used to generate the movement configurations that are clustered to select particular movement configurations for a full analysis as described above. In such embodiments, movement positions are identified as described below. For an instance with multiple nets (e.g. a circuit element with two or more routes connected to different pins of the circuit element), the movement configurations for the circuit element are made up of a movement position from each net.

Data from the movement configurations (e.g. an average position of the positions from each net for a particular configuration) are then clustered and used to reduce the number of configurations that will be analyzed. It will be understood that the operations illustrated in FIGS. 9A and 9B are performed by a device, such as a computing device executing instructions of an EDA software system, and accordingly FIGS. 9A and 9B may be described below with reference to such a computing device.

As shown in FIG. 9A, the clock tree instance 900 includes terminals 902 and 904. A route 906 is connected to the terminal 902, and a route 908 is connected to the terminal 904. The route 906 includes a branch 910 (e.g., a node with two or more connected edges), and the route 908 includes a branch 912. Both the branches 910 and 912 correspond to a core route of a clock tree in which the clock tree instance 900 is included. For example, consistent with some embodiments, the branch 910 may be identified as a target node in search of a binary tree equivalent of the connected route 906, and the branch 912 may be identified as a target node in a search of a binary tree equivalent of the connected route 908. As shown, an offset 914 corresponds to a distance between the terminal 902 and the branch 910, and an offset 916 corresponds to a distance between the terminal 904 and the branch 912.

FIG. 9B illustrates a comparison of the offsets 914 and 916 performed to determine a target offset for the clock tree instance 900. As shown in FIG. 9B, the offsets 914 and 916 are decomposed into a vertical component and a horizontal component. Specifically, the offset 914 is decomposed into a vertical offset 918 (4 µm) and a horizontal offset 920 (5 µm), and the offset 916 is decomposed into a vertical offset 922 (2 µm) and a horizontal offset 924 (12 µm). In determining a target offset, the vertical offset 918 of the offset 914 is compared (e.g., by the computing device) with the vertical offset 922 of the offset 916, and the horizontal offset 920 of the offset 914 is compared (e.g., by the computing device) with the horizontal offset 924 of the offset 916.

A target vertical offset 926 is identified (e.g., by the computing device) based on the vertical offsets 918 and 922 being in the same direction (i.e., upward), and a target horizontal offset 928 is identified (e.g., by the computing device) based on the horizontal offsets 920 and 924 being in the same direction (i.e., rightward). The vertical offset 922 of the offset 916 is selected as the target vertical offset 926 (2 µm) based on the vertical offset 922 corresponding to the minimum value (2 µm<4 µm) of the vertical offsets 918 and 922. The horizontal offset 920 is selected as the target horizontal offset 928 (5 µm) based on the horizontal offset 920 corresponding to the minimum value (5 µm<12 µm) of the horizontal offsets 920 and 924.

Figure 10:
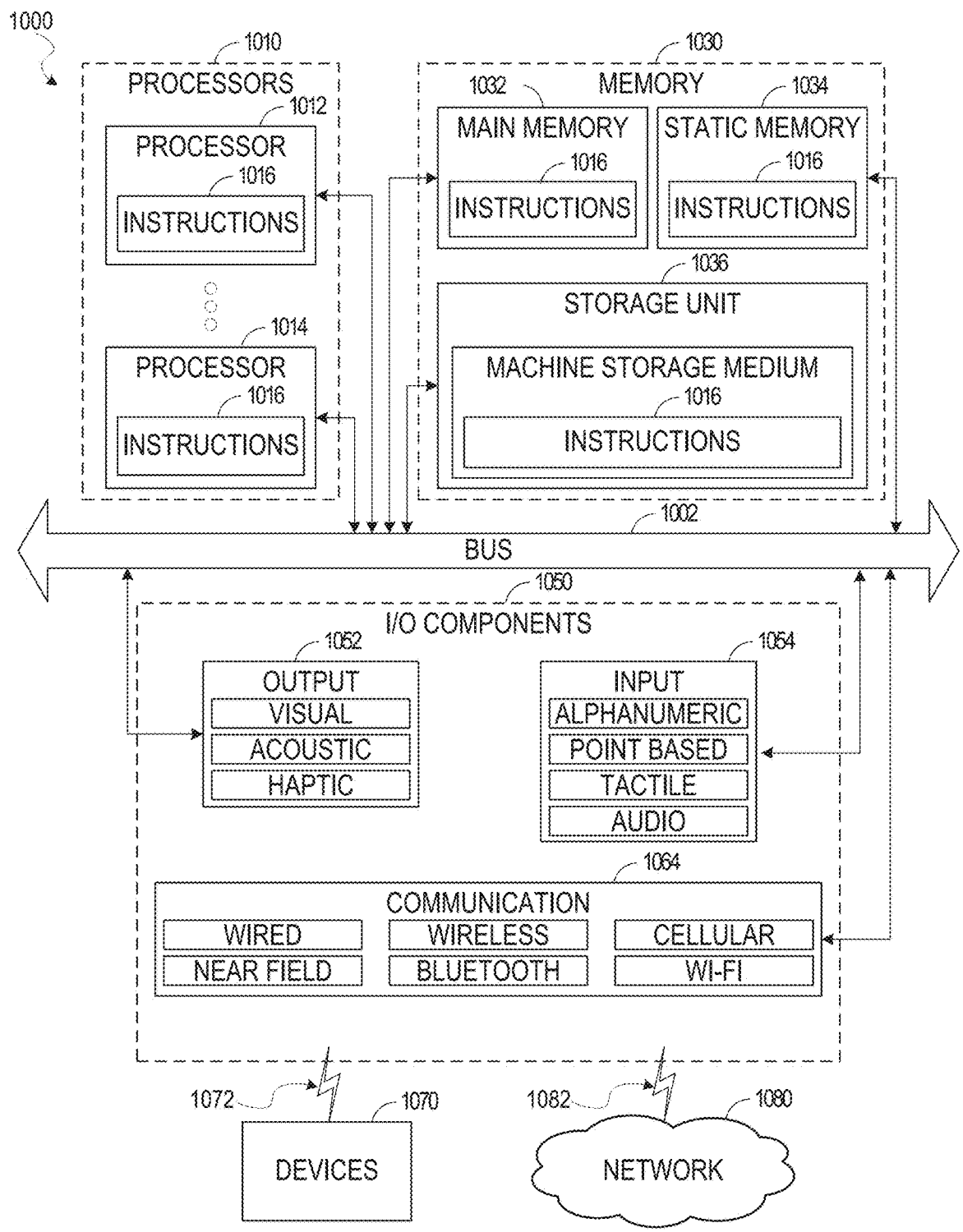
FIG. 10 is a diagrammatic representation of a machine in the example form of a computer system within which a set of instructions for causing the machine to perform any one or more of the methodologies discussed herein may be stored and executed.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute an EDA software system that executes the method 800 described above. Additionally, or alternatively, the instructions 1016 may implement any combination of embodiments described above. The instructions 1016 transform the general, non-programmed machine 1000 into a particular machine 1000 programmed to carry out the described and illustrated functions in the manner described here. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a), a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, both accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities. The devices 1070 may be another machine or any of a wide variety of peripheral devices (e.g., a peripheral device coupled via a universal serial bus (USB)).

Executable Instructions and Machine Storage Medium

The various memories (e.g., 1030, 1032, 1034, and/or memory of the processor(s) 1010) and/or the storage unit 1036 may store one or more sets of instructions and data structures (e.g., software) embodying or utilized by any one or more of the methodologies or functions described herein. These instructions, when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a computer storage medium storing instructions, which when executed by the machine, cause the machine to perform operations comprising:
   accessing an integrated circuit design in memory, the integrated circuit design comprising at least a first circuit element and one or more routes that interconnect terminals of the circuit design with one or more pins of the first circuit element;
   identifying, for each route of the one or more routes that interconnect the terminals of the circuit design with the one or more pins of the first circuit element, a corresponding set of movement positions along said each route to generate a set of movement configurations for the first circuit element;
   analyzing the set of movement configurations for the first circuit element to generate a plurality of location clusters from the set of movement configurations;
   for each location cluster of the plurality of location clusters, identifying one or more selected movement configurations within said each cluster;
   analyzing the one or more selected movement configurations for said each cluster to select an updated movement configuration; and
   generating an updated integrated circuit design based on moving the first circuit element to the updated movement configuration.

2. The system of claim 1, wherein a first selected movement configuration of the one or more selected movement configurations is identified as a movement configuration closest to a center of said each cluster.

3. The system of claim 2, wherein a second selected movement configuration of the one or more selected movement configurations is identified as a movement configuration for said each cluster farthest from an initial placement position.

4. The system of claim 1, wherein the updated movement configuration is selected by ordering the one or more selected movement configurations for said each cluster by distance from an initial placement position;
   analyzing timing constraints for the one or more selected movement configurations for said each cluster by distance starting with a farthest location from the initial placement position; and
   selecting the updated movement configuration as a most distant location from the initial placement position that finds a wirelength saving compared with the initial placement position and does not violate the timing constraints.

5. The system of claim 1, wherein said identifying the corresponding set of movement positions along said each route to generate the set of movement configurations comprises identifying a first portion of the set of movement configurations at wirelength-measured move fractions along said each route.

6. The system of claim 5, wherein said identifying the corresponding set of movement positions along said each route to generate the set of movement configurations comprises identifying a second portion of the set of movement configurations at wirelength measured move fractions along said each route.

7. The system of claim 6, wherein said identifying the corresponding set of movement positions along said each route to generate the set of movement configurations comprises combining the first portion of the set of movement configurations and the second portion of the set of movement configurations along said each route into a predetermined number of movement configurations for said each route.

8. The system of claim 1, wherein the set of movement configurations is generated by computing all combinations of the corresponding set of movement positions along said each route, with each combination of said all combinations consisting of one corresponding movement configuration from said each route.

9. The system of claim 8, wherein the plurality of location clusters from the set of movement configurations is generated using K-means clustering.

10. The system of claim 9, wherein the first circuit element comprises a clock gate, and wherein the clock gate and the one or more routes are part of a clock path and a data path the circuit design.

11. The system of claim 9, wherein the one or more routes comprises three routes with corresponding connections to three pins of the first circuit element;
wherein the corresponding set of movement positions for said each route comprises less than ten locations for said each route;
wherein said all combinations comprises 729 or fewer locations; and
wherein the set of clusters comprises four or fewer clusters.

12. The system of claim 1, wherein the operations further comprise:
generating the corresponding set of movement positions along said each route with a core route for said each route, the core route for said each route comprises a portion of the route having a maximum transitive fanout that is less than a transitive fanout threshold.

13. The system of claim 1, wherein the operations further comprise:
generating a layout instance for the updated integrated circuit design based in part on the updated movement configuration, the layout instance describing physical layout dimensions of the integrated circuit design.

14. The system of claim 13, wherein the operations further comprise:
initiating fabrication of an integrated circuit using the layout instance and the updated integrated circuit design.

15. A method comprising:
accessing, by one or more processors of a machine, an integrated circuit design in memory, the integrated circuit design comprising at least a first circuit element associated with an initial placement position, and one or more routes that interconnect terminals of the circuit design with one or more pins of the first circuit element;
analyzing, using the one or more processors, a central portion of each route of the one or more routes that interconnect the terminals of the circuit design with the one or more pins of the first circuit element, a corresponding set of movement positions along said each route to generate a set of movement configurations for the first circuit element;
analyzing, using the one or more processors, the set of movement configurations for the first circuit element to generate a plurality of location clusters from the set of movement configurations;
for each location cluster of the plurality of location clusters, identifying using the one or more processors, a movement position near to a center of a corresponding cluster and a movement position distant from the initial placement position for the first circuit element within the corresponding cluster;
analyzing the central movement position and the movement position distant from the initial placement position from said each cluster to select an updated movement configuration for the first circuit element.

16. The method of claim 15, wherein said identifying the corresponding set of movement positions along said each route to generate the set of movement configurations comprises identifying a first portion of the set of movement configurations at wirelength-measured move fractions along said each route; and
wherein said identifying the corresponding set of movement positions along said each route to generate the set of movement configurations comprises identifying a second portion of the set of movement configurations at wirelength measured move fractions along said each route.

17. The method of claim 16, wherein said identifying the corresponding set of movement positions along said each route to generate the set of movement configurations comprises combining the first portion of the set of movement configurations and the second portion of the set of movement configurations along said each route into a predetermined number of movement configurations for said each route;
wherein the first circuit element comprises a clock instance; and
wherein a first route of the one or more routes is part of a clock path of the integrated circuit design.

18. The method of claim 15 further comprising:
generating an updated integrated circuit design based on moving the first circuit element to the updated movement configuration; and
creating an integrated circuit using the updated integrated circuit design.

19. A computer-storage medium storing instructions, which when executed by a machine, cause the machine to perform operations comprising:
accessing an integrated circuit design in memory, the integrated circuit design comprising at least a clock instance and one or more routes that interconnect terminals of the clock instance with one or more pins of the clock instance;
identifying, the one or more routes that interconnect the terminals of the circuit design with the one or more pins of the clock instance, a corresponding set of movement positions to generate a set of movement configurations for the clock instance;
analyzing the set of movement configurations for the clock instance to generate a plurality of location clusters from the set of movement configurations;
for each location cluster of the plurality of location clusters, identifying one or more selected movement configurations within said each cluster;
analyzing the one or more selected movement configurations for said each cluster to select an updated movement configuration; and
generating an updated integrated circuit design based on moving the clock instance to the updated movement configuration.

20. The computer-storage medium of claim 19, wherein the clock instances comprises a buffer, an inverter, or a multiplexor; and
wherein the set of movement configurations is generated by computing all combinations corresponding sets of movement configurations along a plurality of routes comprising the one or more routes, with each combination of said all combinations consisting of one corresponding movement configuration from each route of the plurality of routes.

* * * * *